United States Patent [19]

Aizawa et al.

[11] Patent Number: 5,375,999

[45] Date of Patent: Dec. 27, 1994

[54] CATALYST COMBUSTOR

[75] Inventors: Yukio Aizawa; Jun Shonaka; Tomomitsu Takeuchi, all of Yokohama, Japan

[73] Assignee: Nippon Oil Co., Ltd., Tokyo, Japan

[21] Appl. No.: 87,860

[22] Filed: Jul. 9, 1993

[30] Foreign Application Priority Data

Jul. 9, 1992 [JP] Japan .................. 4-182589

[51] Int. Cl.$^5$ .................. F23D 14/12
[52] U.S. Cl. .................. 431/328; 431/170
[58] Field of Search .................. 431/170, 328, 329

[56] References Cited

U.S. PATENT DOCUMENTS 3,982,910 9/1976 Houseman et al. .................. 431/170
4,927,353 5/1990 Nomura et al. .................. 431/328

FOREIGN PATENT DOCUMENTS 86328 5/1985 Japan .................. 431/328
1118855 7/1968 United Kingdom .

Primary Examiner—Carroll B. Dority
Attorney, Agent, or Firm—Oblon, Spivak, McClelland, Maier & Neustadt

[57] ABSTRACT

A catalyst combustor is here disclosed which comprises a catalyst section for permitting the catalyst combustion of a fuel, a burner for preheating the catalyst section, a cross flow type heat exchanger for preheating air for combustion which is disposed in a combustion gas generated by the catalyst combustion, and a fan for feeding the air for combustion to the burner via the cross flow type heat exchanger.

4 Claims, 2 Drawing Sheets 5,375,999

CATALYST COMBUSTOR

BACKGROUND OF THE INVENTION (i) Field of the Invention

The present invention relates to a catalyst combustor in which a gas or liquid fuel such as kerosine or gas oil is burnt in the presence of a combustion catalyst, and more specifically, it relates to a catalyst combustor which can be suitably used for the combustion of a heat source for driving, for example, an air conditioner.

(ii) Description of the Related Art

According to a catalyst combustor in which a fuel gas such as a hydrocarbon and air are brought into contact with a heated catalyst to achieve combustion without flame, extremely small amounts of CO, HC (hydrocarbon) and the like are exhausted and any flame is not present. Therefore, the formation of nitrogen oxides which nowadays cause a social problem is largely inhibited advantageously. In order to stably carry out the catalyst combustion, the preheating of the catalyst and air to be fed is necessary. For the preheating, there are a method of using an electrical heater or a burner, a method of using a heat exchanger, and the like. When the electrical heater is used for the preheating of air even after the start of the catalyst combustion, a large amount of electric power is consumed, and therefore the use of the electrical heater in livelihood is expensive. In addition, when air is preheated by the burner, the formation of the nitrogen oxides cannot be inhibited, so that the large advantage which the catalyst combustor has is impaired. In order to solve these problems, after the start of the catalyst combustion, it is most effective and economical that a part of the heat of a combustion gas is fed to air for combustion by the use of a heat exchanger to preheat the air for combustion.

In one example of conventional catalyst combustors, a discharge passage for the combustion gas is provided adjacent to the inner wall or the outer wall of a passage of air for combustion to carry out heat exchange, thereby preheating the air for combustion. However, this heat exchange is poor in efficiency, and for the sake of the sufficient heat exchange, it is necessary to sufficiently expand the contact range of both the passages, which inconveniently makes the device large. As another example, there is a method of using a rotary regenerative type heat exchanger. In this method, there is a fear that the combustion gas is mixed with the air for combustion, and driving members for the rotation are additionally required, which inconveniently makes the device large.

SUMMARY OF THE INVENTION

The present invention has been attained in view of the above-mentioned problems, and an object of the present invention is to provide a catalyst combustor which has such a small size as to be applicable to a livelihood use such as a domestic use, does not require electric power and the like during operation, permits an economical operation, and produces less amounts of nitrogen oxides.

A catalyst combustor of the present invention comprises a catalyst section for permitting the catalyst combustion of a fuel, a burner for preheating the catalyst section, a cross flow type heat exchanger for preheating air for combustion which is disposed in a combustion gas generated by the catalyst combustion, and a fan for feeding the air for combustion to the burner via the cross flow type heat exchanger.

The preheating of air for combustion necessary to carry out the catalyst combustion can be achieved by advantageously utilizing heat held in the combustion gas obtained under the catalyst by the use of the heat exchanger without using electric power during the operation of the combustor, and therefore the combustor of the present invention permits the economical operation. Flame for the preheating is merely formed only at the preheating of the catalyst and the cross flow type heat exchanger at a starting time, and therefore the inhibition of the nitrogen oxides which is the feature of the catalyst combustion is effectively achieved and the production of unburnt components such as CO and HC is also inhibited, whereby clean combustion is possible. Moreover, the cross flow type heat exchanger having a high efficiency is used as the heat exchanger, and therefore the very compact catalyst combustor can be provided. This catalyst combustor can be applied to a wide range inclusive of domestic heaters, small-sized livelihood equipments and large-sized livelihood equipments.

DETAILED DESCRIPTION OF THE PREFERRED EMBODIMENT

Now, one embodiment regarding the present invention will be described in reference to drawings.

Figure 1:
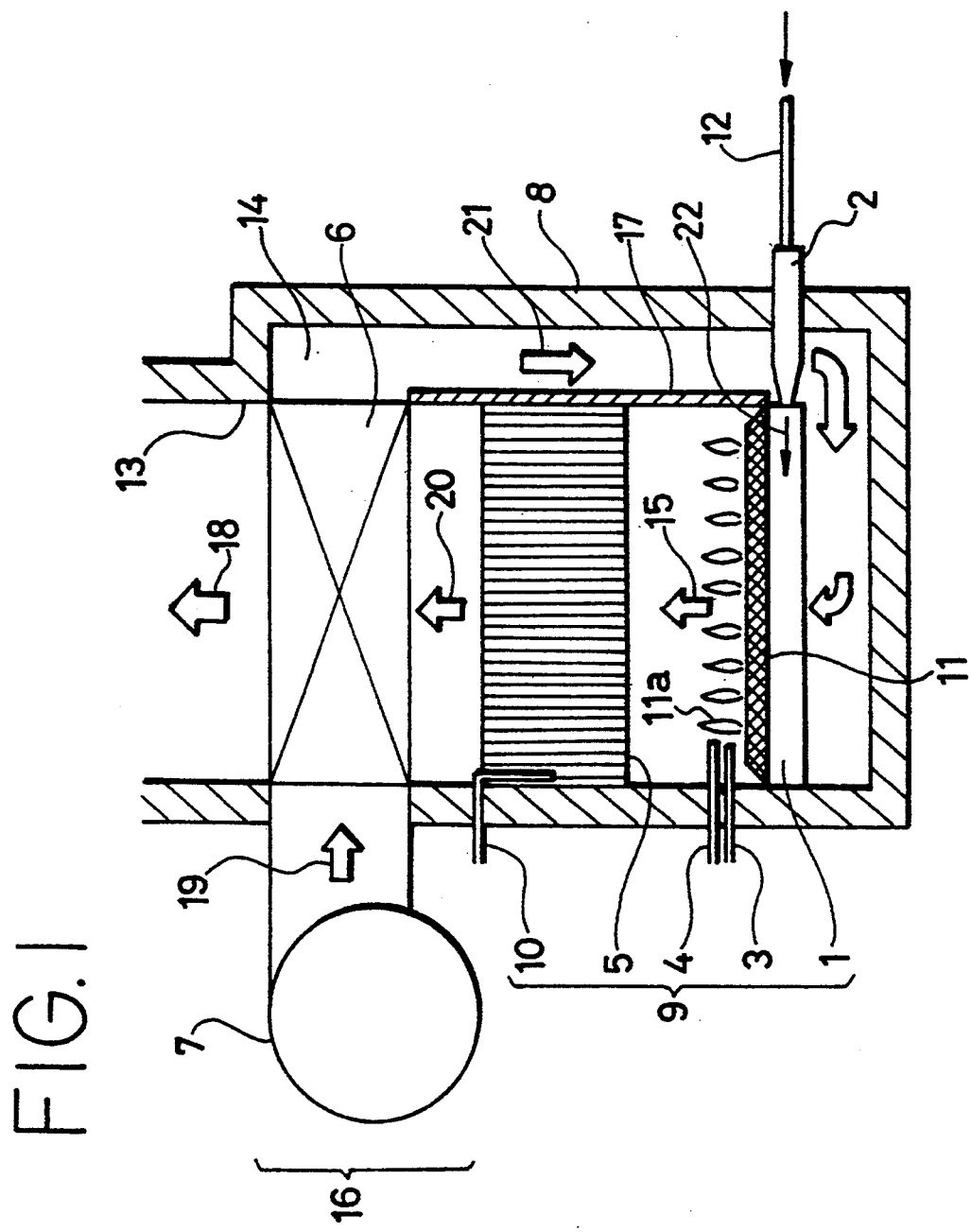
FIG. 1 is a constitutional view showing one embodiment of a catalyst combustor of the present invention.
Figure 2:
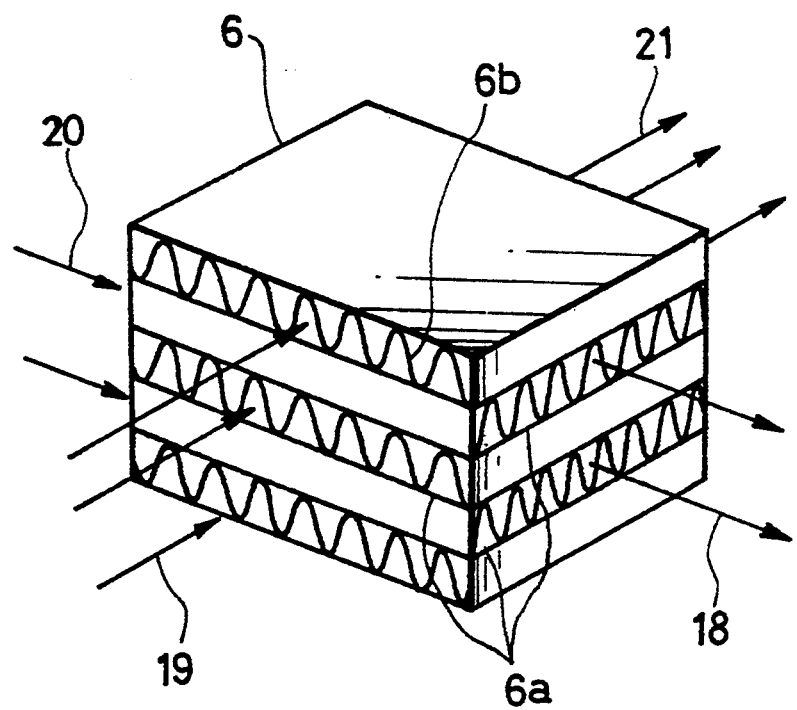
FIG. 2 is a schematic perspective view of a cross flow type heat exchanger shown in FIG. 1.

FIG. 1 is a sectional view showing one embodiment of a catalyst combustor of the present invention, and FIG. 2 is a perspective view of a cross flow type heat exchanger shown in FIG. 1. Reference numeral 1 is a burner section for heating a catalyst section 5 up to a temperature at which the catalyst section 5 begins catalyst combustion. This burner section 1 is arranged in a lower portion in a thermal insulating member 8 forming the combustor itself. An ignition plug 3 and a flame detector 4 are disposed above the burner section 1. A carburetor 2 gasifies a liquid fuel to prepare a fuel gas 22 and feeds this gas 22 to the burner section 1. A fuel feed line 12 is connected to this carburetor 2.

Reference numeral 5 is the catalyst section for the catalyst combustion, and this catalyst section 5 is arranged above the burner section 1. As the catalyst section 5, a catalyst can be used in which an active metal is supported on a heat-resistant carrier. Examples of the heat-resistant carrier include ceramics such as cordierite, mullite, $\alpha$-alumina and titania. Examples of the active metal include platinum group metals such as Pt and palladium. In this embodiment, the catalyst section 5 has a honeycomb form. The honeycomb catalyst is prepared into a desired size and then directly used.

The catalyst section 5 can be used in another conformation. That is, a boxy or cylindrical container is packed with the catalyst having a granular form, a rod form or a pellet form, and the container containing the catalyst may be used as the catalyst section 5.

These catalysts are known, and any of commercially available catalysts can be utilized.

Reference numeral 10 is a temperature detector for detecting a temperature of the catalyst section 5, in other words, a temperature detector for detecting that the catalyst section 5 is heated up to a temperature at which the catalyst combustion can be carried out. A catalyst combustion section 9 is constituted of the carburetor 2, the burner section 1, the ignition plug 3, the flame detector 4 and the catalyst section 5.

A flame hole plate 11 is disposed on the burner section 1, and this flame hole plate 11 uniformly feeds the fuel gas so as to uniformize a flame 11a and comprises a plate having plural openings made of a ceramic material, a metal or the like.

A fan 7 is a device for feeding air for combustion 19 to the burner section 1 and the catalyst section 5. A cross flow type heat exchanger 6 is arranged in a combustion gas above the catalyst section 5, and in the heat exchanger 6, heat exchange is carried out between a combustion gas 20 from the catalyst section 5 and the air for combustion 19 coming through the fan 7 to heat the air for combustion 19. In the heat exchanger 6, the flow of the combustion gas 20 and that of the air for combustion 19 cross separately at substantially right angles. As shown in FIG. 2, the cross flow type heat exchanger 6 is constituted of a plurality of partition panels 6a having heat conductivity and a plurality of space plates 6b which have a wave form or another form and which are alternately arranged between the partition panels 6a so as to cross at substantially right angles. According to this heat exchanger 6, the heat exchange is achieved by leading the flow of the air for combustion 19 and that of the combustion gas 20 through the space plates 6b between the partition panels 6a so as to cross at substantially right angles without mixing the gases. The materials of the partition panels 6a and the space plates 6b are ceramics and the like. A heat exchange section 16 is constituted of the fan 7 and the cross flow type heat exchanger 6. Numeral 14 is a passage of the air for combustion which is defined by a thermal insulating partition plate 17 and the thermal insulating member 8, and the passage 14 extends from the cross flow type heat exchanger 6 to the burner section 1. Numeral 13 is a discharge orifice of the combustion gas. Numeral 8 is the thermal insulating member which covers the whole device.

Next, the operation of the catalyst combustor of the present invention will be described.

This operation can be classified into two portions of the preheating operation of the catalyst section 5 and the cross flow type heat exchanger 6, and the stable catalyst combustion. These operations can be automatically carried out by a control device not shown.

In the first place, the catalyst combustor is operated, so that the fan 7 and the burner section 1 are driven, and the preheating operation of the catalyst section 5 and the cross flow type heat exchanger 6 starts. That is, a mixed gas of the fuel gas 22 vaporized by the carburetor 2 and the air for combustion 19 from the fan 7 is ignited by the ignition plug 3 disposed above the burner section 1, so that the flame 11a is formed on the flame hole plate 11. This flame 11a is monitored by the flame detector 4, and the catalyst section 5 is preheated by the flame 11a. The flame combustion by the burner section 1 preheats the cross flow type heat exchanger 6 disposed above the catalyst section 5 (on the downstream side of the flow of the combustion gas), whereby the temperature of the air for combustion 19 is raised to smooth the transfer from the flame combustion by the burner section 1 to the catalyst combustion by the catalyst section 5 as mentioned later. In the catalyst section 5, the temperature detector 10 is embedded, and this detector 10 detects that the catalyst section 5 has been preheated up to a temperature enough to stably carry out the catalyst combustion. When it is detected by the temperature detector 10 that the catalyst section 5 has been sufficiently preheated, the fuel feed line 12 is closed to stop the operation of the carburetor 2, with the result that the flame supported on the flame hole plate 11 disappears to bring the preheating to an end. Moreover, the flame combustion by the burner section 1 also terminates, whereby the operation of the preheating is brought to an end.

Next, the stable catalyst combustion is begun. That is, after the flame has disappeared, the fuel feed line 12 is opened again, and the carburetor 2 is operated. The air for combustion 19 from the fan 7 is passed through the cross flow type heat exchanger 6 preheated by the combustion of the burner section 1, and at this time, the air is preheated up to a temperature necessary to stably carry out the catalyst combustion. Afterward, the air for combustion 19 is mixed with the fuel gas 22 vaporized by the carburetor 2 to become a vaporized gas 15. This vaporized gas 15 reaches the catalyst section 5 through the burner section 1 without burning, and it is burnt herein to achieve the stable catalyst combustion. The combustion gas 20 produced under the influence of the catalyst section 5 is passed through the cross flow type heat exchanger 6 and then discharged as a combustion gas 18 through the discharge orifice 13 of the combustion gas. The discharged combustion gas is fed as the high-temperature gas to various applications. On the other hand, in the cross flow type heat exchanger 6, the air for combustion 19 fed to the cross flow type heat exchanger 6 through the fan 7 is effectively subjected to heat exchange with the combustion gas 20 obtained by the catalyst combustion to become a preheated air for combustion 21, and the thus preheated air 21 is fed to the burner section 1 via the passage 14 of the air for combustion. In the burner section 1, the preheated air for combustion 21 is mixed with the fuel gas 22 vaporized by the carburetor 2 to become the vaporized gas 15, and this vaporized gas 15 reaches the catalyst section 5 through the flame hole plate 11. At this time, no flame is formed on the flame hole plate 11. The flame detector 4 is used in order to detect that the vaporized gas 15 does not ignite prior to reaching the catalyst section 5. Afterward, the above-mentioned operation is recycled.

In the last place, as an extinction operation, the fuel feed line 12 is closed and simultaneously the carburetor 2 is stopped. The vaporized gas which remains between the burner section 1 and the catalyst section 5 is entrained by the preheated air for combustion 21 preheated by the cross flow type heat exchanger 6 and then completely oxidized on the catalyst section 5. Therefore, unburnt components such as CO and HC are scarcely discharged. After it has been detected by the temperature detector 10 that the catalyst section 5 has been cooled to a sufficiently safe temperature, the fan 7 is stopped and the catalyst combustor is returned to an initial state.

In the above-mentioned embodiment, the heat exchanger 6 is used in which two kinds of gases flow so as to cross at right angles without mixing the gases, but this angle is not limited. Thus, in the present invention, the heat exchangers in which the gases flow at various angles can be utilized within the range of the gist of the present invention. For example, the flows of the gases may cross at an angle of 45° or 135° without mixing.

In addition, in the above-mentioned embodiment, the liquid fuel has been used, but a gaseous fuel can also be used.

What is claimed is:

1. A catalyst combustor comprising:

a catalyst section for permitting a catalyst combustion of a fuel, said catalyst section comprising an active metal catalyst supported by a honey-comb shaped ceramic carrier;

a burner for preheating the catalyst section;

a cross flow type heat exchanger for preheating air for combustion which is disposed in a combustion gas generated by the catalyst combustion, said cross flow type heat exchange being disposed above said catalyst section;

a fan including means for feeding the air for combustion to the burner via said cross flow type heat exchanger; and a carburetor for gasifying a liquid fuel to a fuel gas which is to be fed to said burner.

2. The catalyst according to claim 1, wherein said active metal catalyst comprises platinum group metals.

3. The catalyst according to claim 1, wherein said liquid fuel is kerosine or oil.

4. The catalyst according to claim 1, further comprising a temperature detector for detecting a temperature of said catalyst section, wherein said gasifying of said liquid fuel by said carburetor and a flame combustion by said burner are stopped when said temperature detector detects that said catalyst section has reached a predetermined preheating temperature.

* * * * *